Jan. 7, 1930. T. N. AIKENS 1,742,432
VEHICLE WHEEL
Filed April 3, 1925 2 Sheets-Sheet 2
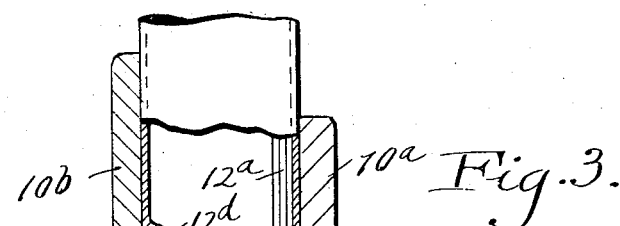
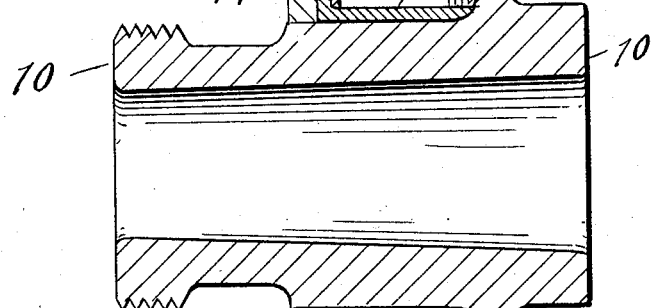
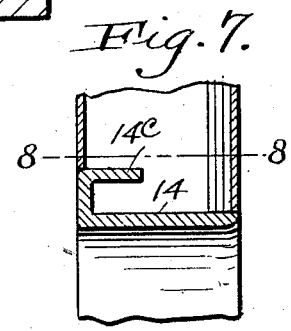
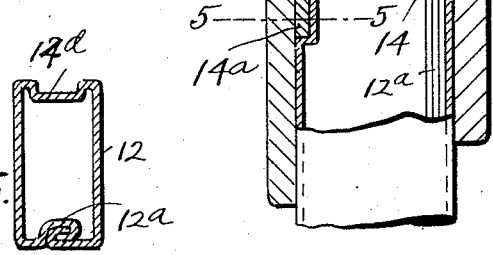
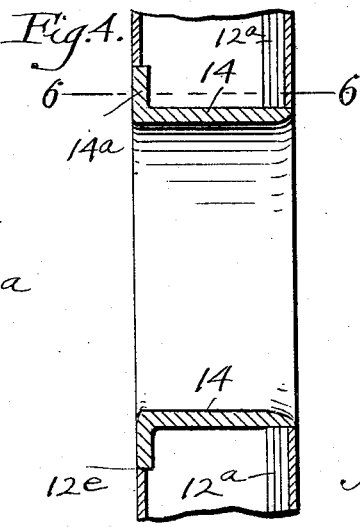
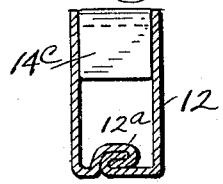
Inventor
Thomas N. Aikens
By Knois Hudson & Kent.
Attorneys Patented Jan. 7, 1930

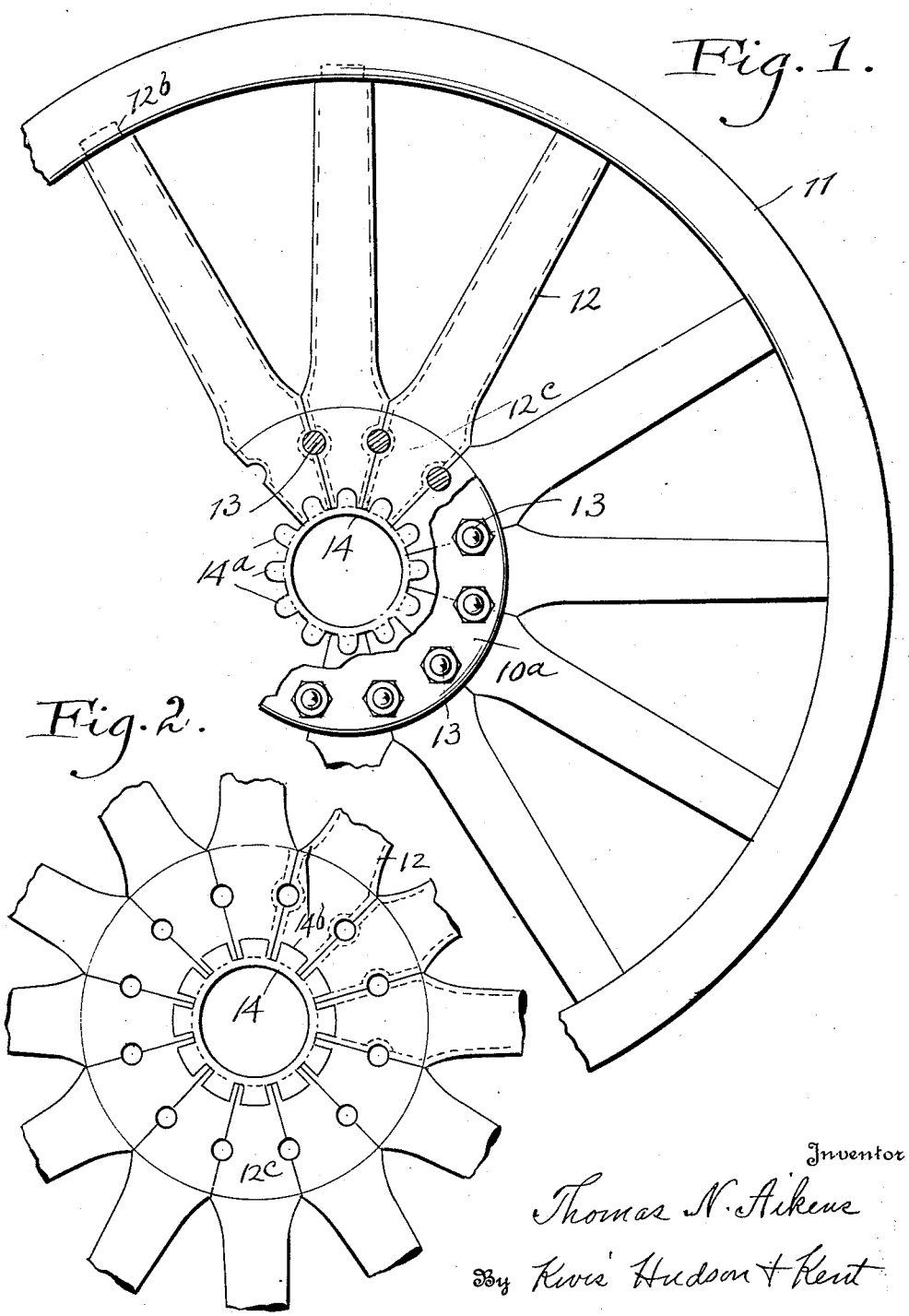

1,742,432

UNITED STATES PATENT OFFICE

THOMAS N. AIKENS, OF DAYTON, OHIO, ASSIGNOR OF ONE-HALF TO DAVID D. WALKER, OF DAYTON, OHIO

VEHICLE WHEEL

Application filed April 3, 1925. Serial No. 20,405.

This invention relates to vehicle wheels of the general type illustrated in my prior application, Serial No. 487,292. In said prior application I have disclosed a vehicle wheel having tubular sheet metal spokes which extend from the hub to the felloe. These spokes, as described in said application, are each formed from one piece of sheet metal suitably shaped in dies into tubular form, with their edge portions interlocked in the form of a double seam. Additionally, these spokes have enlarged wedge-shaped hub portions, the tapered faces of the adjoining spokes engaging one another and being clamped by transversely extending bolts between the flanges of the hub. In practice the bolts referred to, pass through the flanges of the hub between the spokes or through depressions formed on the adjoining tapered faces of the hub ends of the spokes.

The principal object of the present invention is to provide a reinforcement for the inner ends of the spokes so as to prevent their collapsing, particularly under severe conditions of use, as, for example, when the brakes of the vehicle are suddenly applied, causing the wheels to slide over the ground and tending to rotate the rim relative to the hub.

Further, the invention aims to provide a reinforcing member which also centers the spokes and holds them in alignment both for purposes of assembly and after assembly, and serving particularly to prevent radial displacement of one or more spokes relative to the others by the provision of a central seating member against which the inner ends of the spokes bear.

In carrying out my invention, the inner ends of the spokes are interlocked with the reinforcing member and preferably this is in the form of a bushing which the inner ends of the spokes engage and which has portions interlocking with the spokes or with such portions thereof as are liable to collapse under extreme conditions of use.

In the accompanying sheets of drawings wherein I have shown slightly different ways of carrying out the invention, Fig. 1 is a side elevation of a portion of a wheel embodying my invention with portions broken away; Fig. 2 is a similar view showing the hub portion of a wheel with the hub proper removed; Fig. 3 is a view partly in elevation and partly in section on a large scale taken through the center and axis of the wheel; Fig. 4 is a sectional view showing the central reinforcing member and portions of the spokes and illustrating a modification; Fig. 5 is a similar view showing a further modification; Fig. 6 is a sectional view through the spoke near its inner end substantially along the line 6—6 of Fig. 3; Fig. 7 is a similar sectional view substantially along the line 7—7 of Fig. 4; and Fig. 8 is a similar sectional view substantially along the line 8—8 of Fig. 5.

Referring now to the drawings, the wheel includes a hub 10, (Fig. 3) a felloe or rim portion 11, and tubular sheet metal spokes 12, which are preferably formed substantially as explained in my prior application. That is to say, each spoke is preferably made from one piece of sheet metal into tubular form, the edge portions of the sheet being interlocked in a double seam indicated at $12^a$, and the outer ends of the spokes having reduced portions $12^b$ connected to the felloe and the inner ends having wedge-shaped hub portions $12^c$ with two opposite parallel faces and two tapered faces. The tapered faces of adjoining spokes engage one another and the hub portions of the spokes are clamped between the flanges $10^a$ and $10^b$ of the hub by transverse bolts 13 which extend through the flanges of the hub and between the adjacent or engaging faces of the spokes, which faces are provided with inset or depressed portions to accommodate the bolts.

Under certain circumstances there is a tendency for the extreme inner ends of the spokes to collapse, particularly when a vehicle equipped with the wheels is brought to a sudden stop by the application of brakes associated with the wheels, the rim then having a tendency to rotate relative to the hub, and the spokes to turn about the bolts 13 of the hub.

To obviate this difficulty or disadvantage, I provide a reinforcement for the inner ends of the spokes, which reinforcement also acts as a center or centering member for the spokes. The reinforcement is preferably in the form of a bushing 14 which surrounds the hub 10 between the flanges 10ª and 10ᵇ, and is not only engaged by the inner ends of the spokes, but is interlocked with such ends so as to reinforce them against collapsing by pressure applied transversely to such inner ends under the circumstances or conditions mentioned above. To bring about this interlocking and reinforcement, the bushing 14 is provided at one end with a series of upwardly projecting tangs or fingers 14ª which engage and reinforce the sides of the hub portions of the spokes at and adjacent their inner ends. The interlocking and reinforcement may be accomplished in different ways. For example with the construction illustrated in Figs. 1, 3 and 5, the side walls of the spoke are set-in or depressed, and the tangs 14ª fit into the depressions. The interlocking and reinforcement of the spokes by the tangs 14ª are on the sides thereof opposite from the sides on which the seams are formed. The seamed side of each spoke requires no reinforcement since it is reinforced by the seam itself. The side opposite the seam is therefore reinforced not only by the tang which is fitted into the depression, but the depression itself serves to reinforce the spoke.

Instead of depressing the sides of the spokes to receive the correspondingly shaped tangs 14ª, which with the form of the invention shown in Fig. 1, have rounded outer ends, the sides may be cut away to receive the tangs, as illustrated in Figs. 2, 4 and 6, where the tangs are designated 14ᵇ, and the cut away portions of the spokes are designated 12ᵉ. With this construction the cut away portions or notches in the sides of the spokes are slightly wedge-shaped, and preferably extend the full width of the inner ends of the spokes, or from one tapered face to the other, and the tangs are correspondingly shaped, and closely fit the notches. When the tangs extend into notches or cut away portions of the spokes they may be extended laterally part way or all the way across the spoke, as illustrated in Figs. 5 and 8, in which event they will bear against the inner sides of the tapered faces, this being illustrated in said figures, wherein the tangs are designated 14ᶜ.

With all forms of the above described construction of reinforcement, the portions of the bushing which fit or interlock with the spokes are of greater thickness than the metal of which the spoke is formed so as to provide more resistance than the relatively thin metal of the spoke itself would provide to crushing by transverse pressure applied between the engaging tapered faces of the spokes near the hub.

The inner ends of the spokes all engage the bushing 14, and in practice during the assembly of the wheel, the spokes are arranged and held in circular formation with their outer ends engaging the felloe, and when so assembled the central hole for the bushing is bored or reamed out, and then the bushing is driven or pressed into place with the tangs entering the depressions or notches as the case may be.

This holds the parts together, with the spokes in proper relationship, and prevents distortion from the proper circular arrangement prior to the application of the wheel to the hub 10. This is of importance, for the original assembly takes place independently of the hubs, and it is frequently the case that the wheels are shipped and later applied to the hubs at the plants of automobile manufacturers, and the bushings serve the important purpose of preventing distortion of the spoke and felloe assembly from the true circular shape, which distortion might otherwise occur by a blow accidentally or otherwise given to the felloe.

Other ways of carrying out the invention may occur to one skilled in this art, and I therefore do not care to be confined to the precise details shown, but aim in my claim to cover all modifications which do not involve a departure from the spirit and scope of my invention.

Having described my invention, I claim:

A wheel having a plurality of radially arranged tubular spokes provided with longitudinally extending ribs and engaging hub portions, a reinforcing member engaging the inner ends of said spokes, depressions formed in the side walls of said hub portions opposite to said ribs, and radially extending fingers formed on said reinforcing member disposed in said depressions to reinforce said hub portions on the sides opposite to said ribs.

In testimony whereof, I hereunto affix my signature.

THOMAS N. AIKENS.